United States Patent
Lee et al.

(10) Patent No.: US 11,219,029 B2
(45) Date of Patent: Jan. 4, 2022

(54) METHOD FOR PERFORMING SEMI-PERSISTENT SCHEDULING (SPS) ACTIVATION IN MULTIPLE SPS RESOURCES IN WIRELESS COMMUNICATION SYSTEM AND A DEVICE THEREFOR

(71) Applicant: LG Electronics Inc., Seoul (KR)

(72) Inventors: Sunyoung Lee, Seoul (KR); Hanul Lee, Seoul (KR)

(73) Assignee: LG Electronics Inc., Seoul (KR)

(*) Notice: Subject to any disclaimer, the term of this patent is extended or adjusted under 35 U.S.C. 154(b) by 0 days.

(21) Appl. No.: 16/754,318

(22) PCT Filed: Nov. 5, 2018

(86) PCT No.: PCT/KR2018/013302
§ 371 (c)(1),
(2) Date: Apr. 7, 2020

(87) PCT Pub. No.: WO2019/112186
PCT Pub. Date: Jun. 13, 2019

(65) Prior Publication Data
US 2020/0314855 A1    Oct. 1, 2020

Related U.S. Application Data

(60) Provisional application No. 62/595,521, filed on Dec. 6, 2017.

(51) Int. Cl.
*H04W 72/04* (2009.01)
*H04W 4/40* (2018.01)
(Continued)

(52) U.S. Cl.
CPC ....... *H04W 72/0493* (2013.01); *H04L 5/0082* (2013.01); *H04L 5/0098* (2013.01); *H04W 4/40* (2018.02); *H04W 80/02* (2013.01)

(58) Field of Classification Search
CPC ... H04W 72/0493; H04W 4/40; H04W 80/02; H04W 72/042; H04W 72/04;
(Continued)

(56) References Cited

U.S. PATENT DOCUMENTS

| 2010/0111026 A1* | 5/2010 | Hsu | H04L 1/1893 370/329 |
| 2016/0119969 A1 | 4/2016 | Vajapeyam et al. | |

(Continued)

OTHER PUBLICATIONS

Ericsson, "Remaining issues of sTTI and SPS," R2-1712446, 3GPP TSG-RAN WG2 #100, Reno, Nevada, USA, dated Oct. 27-Dec. 1, 2017, 3 pages.

(Continued)

*Primary Examiner* — Afshawn M Towfighi
(74) *Attorney, Agent, or Firm* — Fish & Richardson P.C.

(57) ABSTRACT

The present invention relates to a wireless communication system. More specifically, the present invention relates to a method and a device for performing a SPS activation in multiple SPS resources in wireless communication system, the method comprising: receiving an activation command for a first set of Semi-Persistent Scheduling (SPS) resources from a network, wherein a second set of SPS resources which is already activated on the UE; activating the first set of SPS resources and deactivating the second set of SPS resources based on the activation command for the first set of SPS resources; and transmitting a SPS confirmation Medium Access Control (MAC) Control Element (CE) which indicates that the UE successfully deactivates the second set of SPS resources and activates the first set of SPS resources, in a response to the activation command for the first set of SPS resources.

8 Claims, 9 Drawing Sheets

(51) Int. Cl.
*H04L 5/00* (2006.01)
*H04W 80/02* (2009.01)

(58) Field of Classification Search
CPC ............ H04W 72/0406; H04L 5/0082; H04L 5/0098; H04L 5/003; H04L 5/0094; H04L 5/0096; H04L 5/0078
See application file for complete search history.

(56) References Cited

U.S. PATENT DOCUMENTS

| | | | |
|---|---|---|---|
| 2017/0303302 A1 | 10/2017 | Bagheri et al. | |
| 2018/0139734 A1* | 5/2018 | Babaei | H04W 72/0406 |
| 2018/0213452 A1* | 7/2018 | Kim | H04L 5/0053 |
| 2019/0090156 A1* | 3/2019 | Kim | H04L 69/04 |
| 2019/0245657 A1* | 8/2019 | Lee | H04L 1/1812 |
| 2020/0022174 A1* | 1/2020 | Karaki | H04L 1/1812 |

OTHER PUBLICATIONS

LG Electronics Inc., "SPS in sTTI," R2-1713245, 3GPP TSG-RAN2 Meeting #100, Reno, USA, dated Nov. 27-Dec. 1, 2017, 3 pages.
LG Electronics Inc., "Using multiple SPS on SCells," R2-1711571, 3GPP TSG-RAN WG2 Meeting #99-Bis, Prague, Czech Republic, dated Oct. 9-Oct. 13, 2017, 2 pages.
PCT Iternational Search Report and Written Opinion in International Application No. PCT/KR2018/013302, dated Feb. 22, 2019, 10 pages.

* cited by examiner

[Fig. 1]
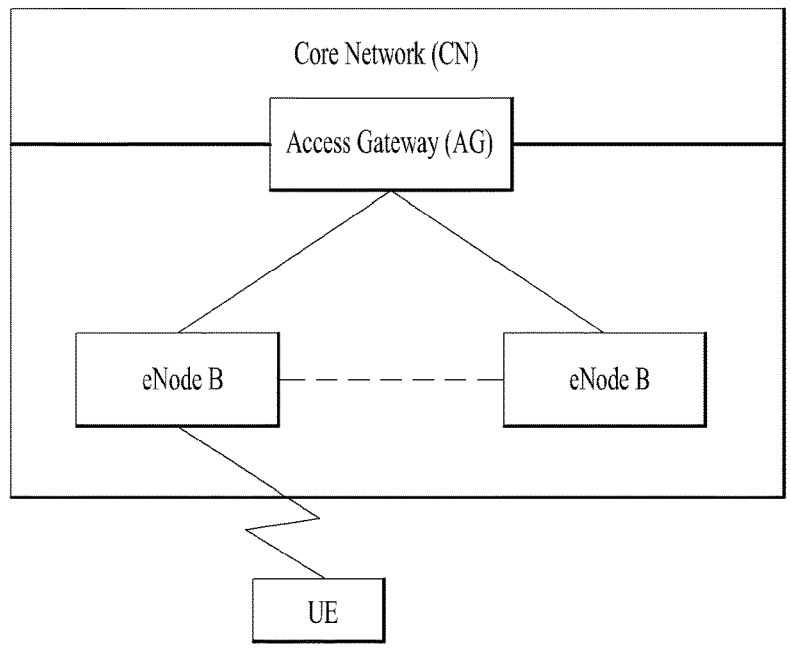
[Fig. 2a]
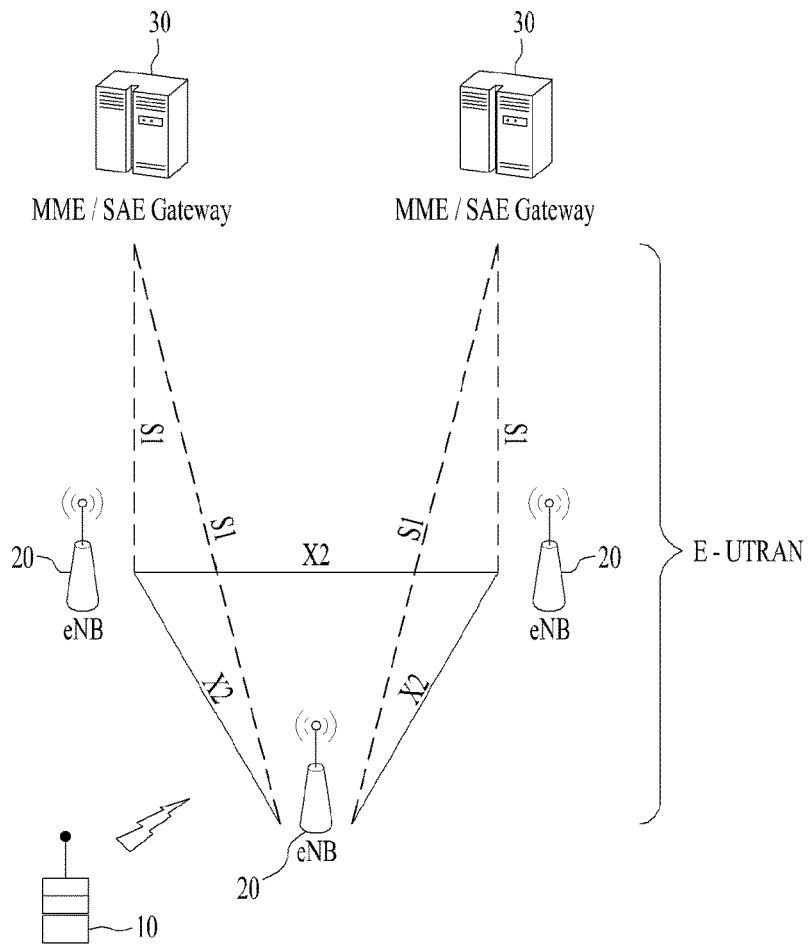

[Fig. 2b]
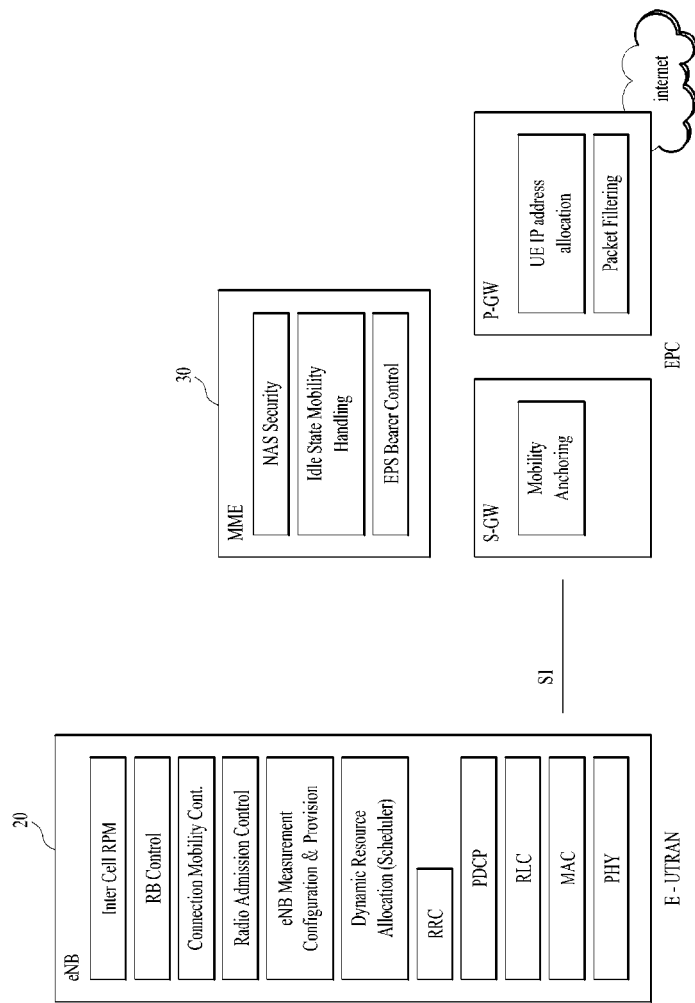

[Fig. 3]
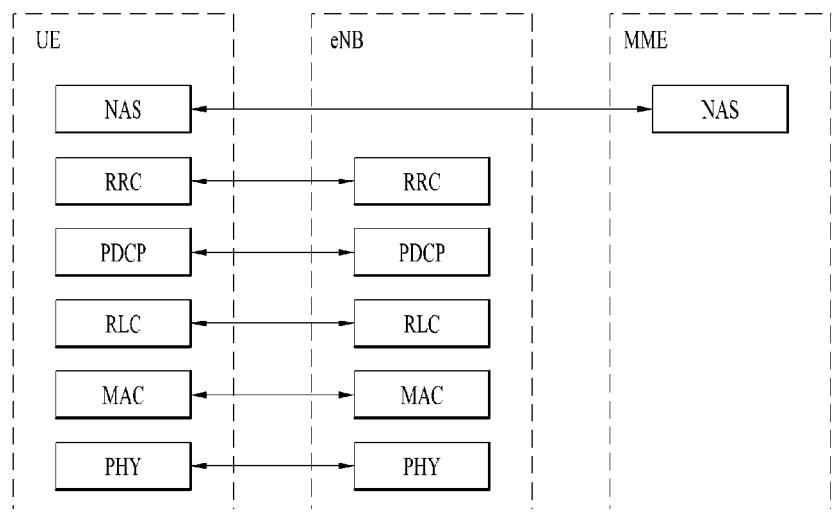
(a) Control-Plane Protocol Stack
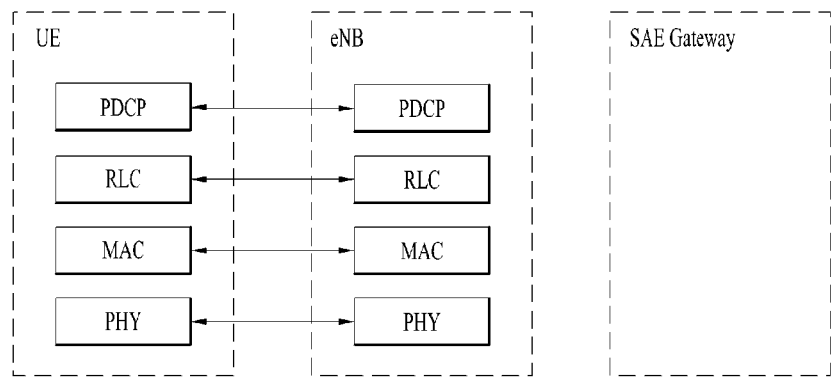
(b) User-Plane Protocol Stack

[Fig. 4a]
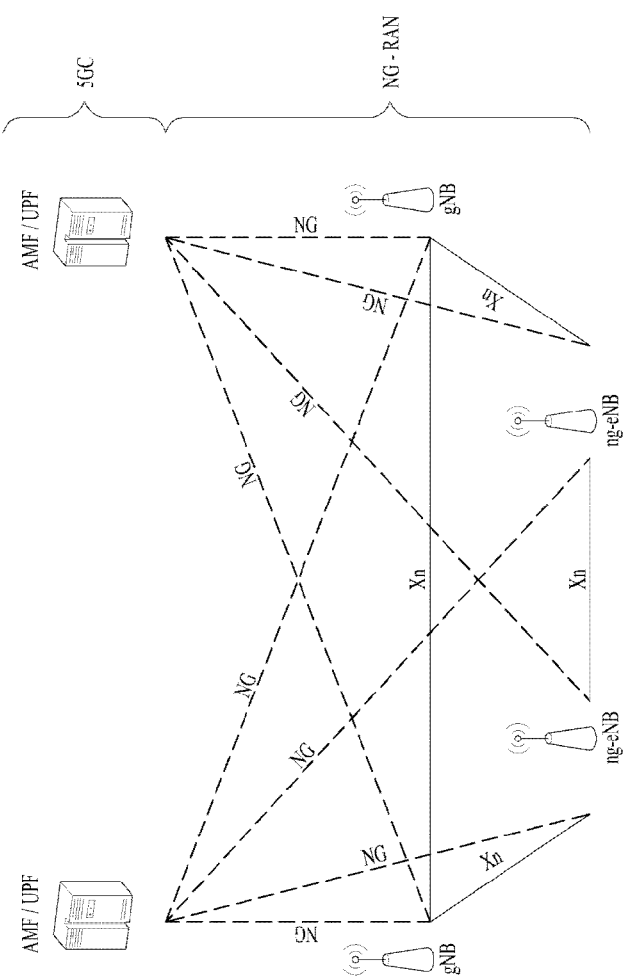

[Fig. 4b]
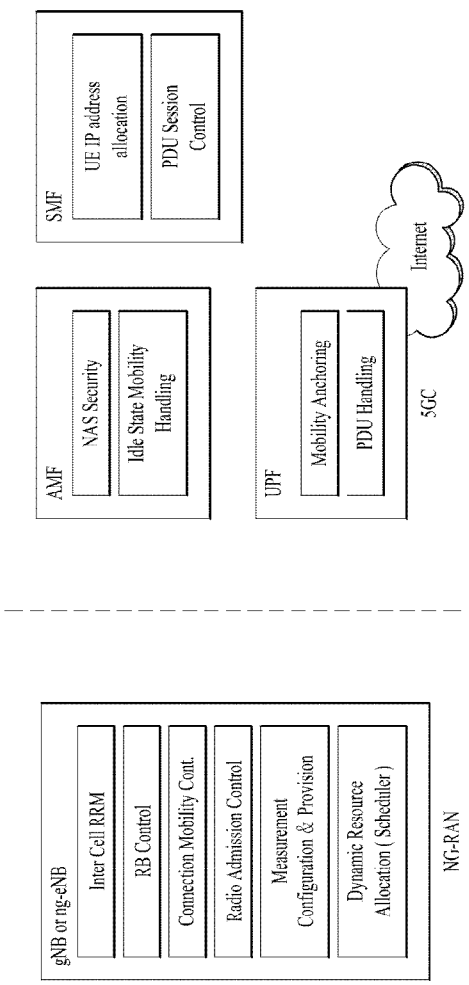

[Fig. 5]
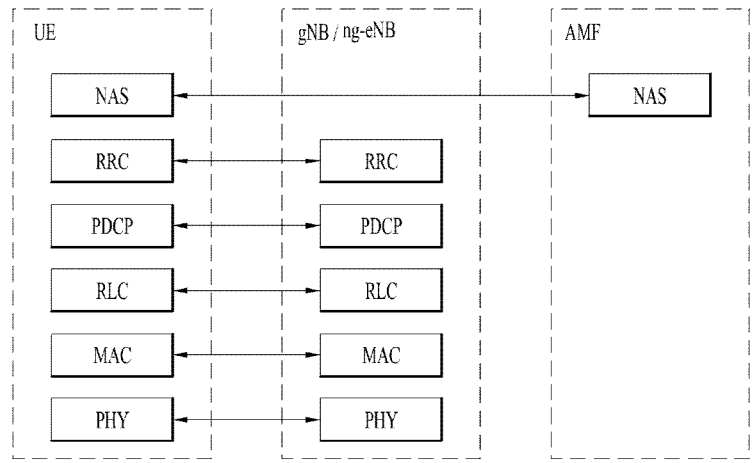
(a) Control-Plane Protocol Stack
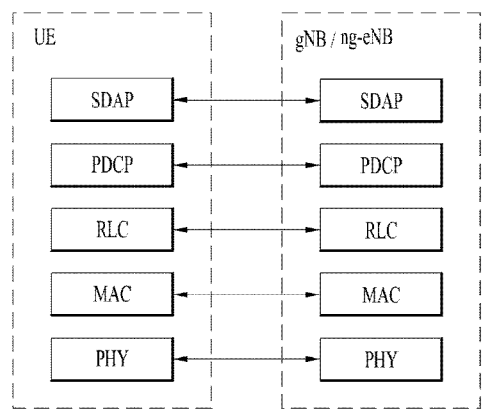
(b) User-Plane Protocol Stack
[Fig. 6]
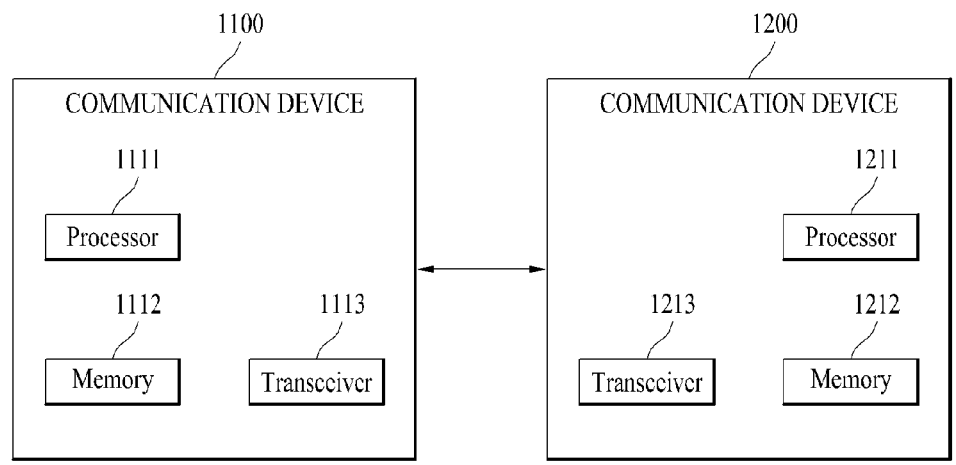

[Fig. 7]
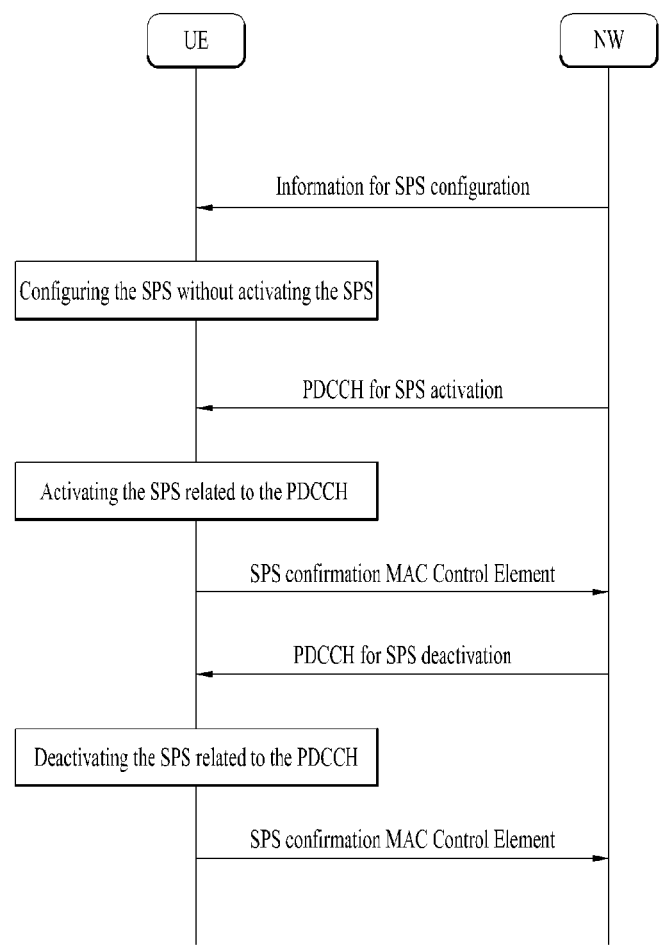

[Fig. 8]
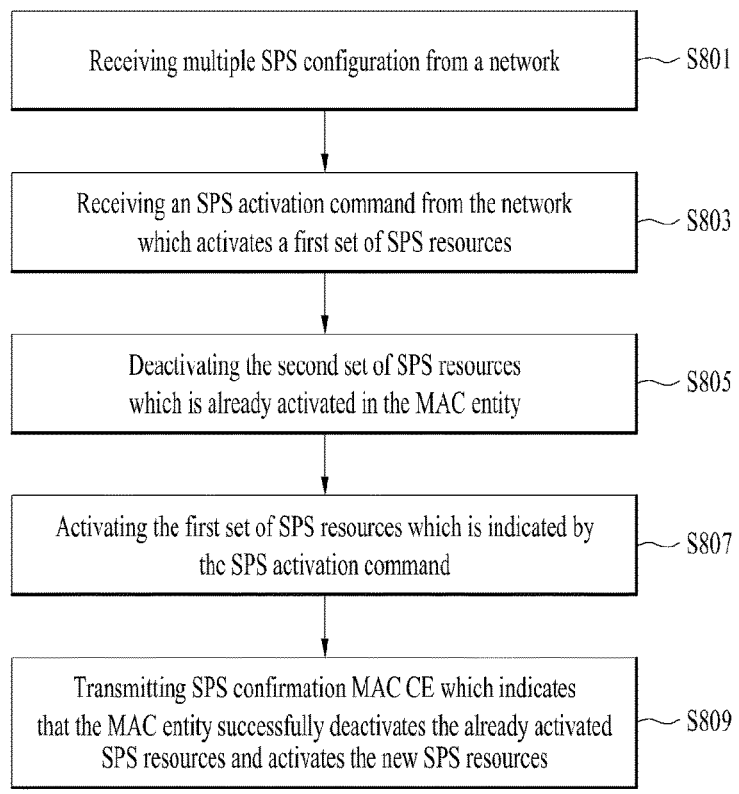
[Fig. 9]
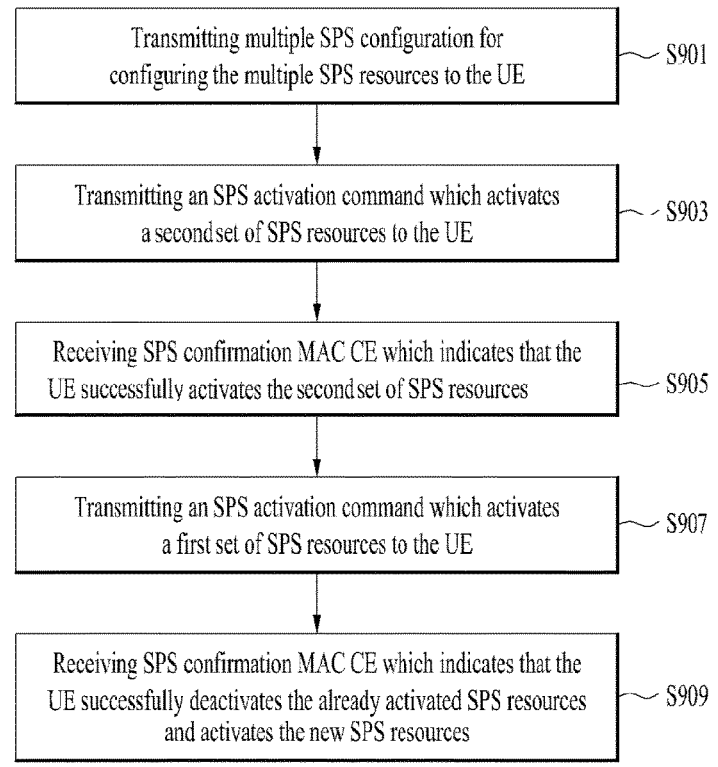

[Fig. 10]
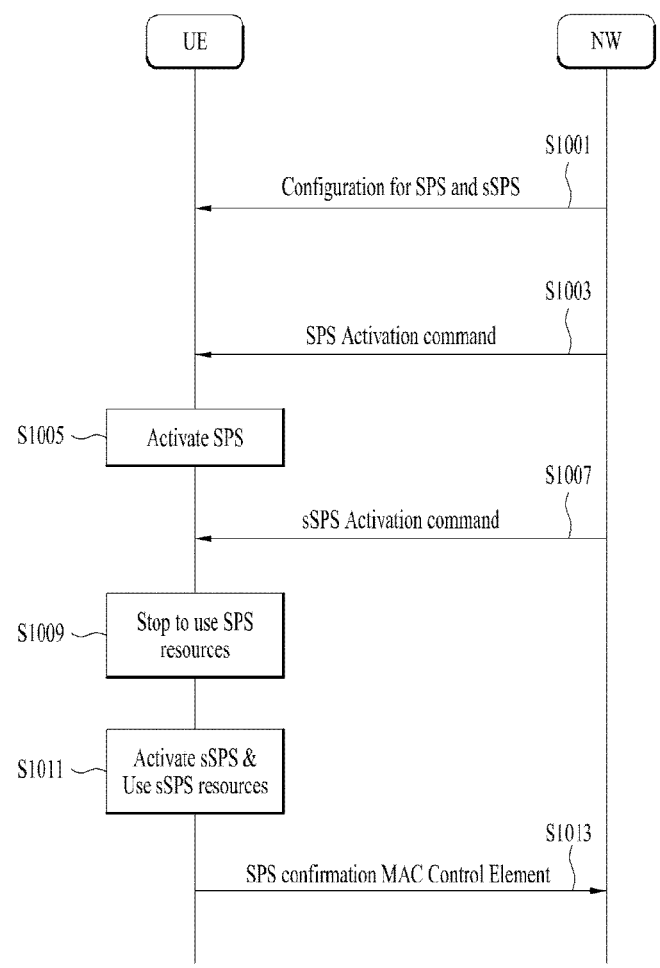

METHOD FOR PERFORMING SEMI-PERSISTENT SCHEDULING (SPS) ACTIVATION IN MULTIPLE SPS RESOURCES IN WIRELESS COMMUNICATION SYSTEM AND A DEVICE THEREFOR

CROSS-REFERENCE TO RELATED APPLICATIONS

This application is a National Stage application under 35 U.S.C. § 371 of International Application No. PCT/KR2018/013302, filed on Nov. 5, 2018, which claims the benefit of U.S. Provisional Application No. 62/595,521, filed on Dec. 6, 2017. The disclosures of the prior applications are incorporated by reference in their entirety.

TECHNICAL FIELD

The present invention relates to a wireless communication system and, more particularly, to a method for performing a SPS activation in multiple SPS resources in wireless communication system and a device therefor.

BACKGROUND ART

As an example of a mobile communication system to which the present invention is applicable, a 3rd Generation Partnership Project Long Term Evolution (hereinafter, referred to as LTE) communication system is described in brief.

FIG. 1 is a view schematically illustrating a network structure of an E-UMTS as an exemplary radio communication system. An Evolved Universal Mobile Telecommunications System (E-UMTS) is an advanced version of a conventional Universal Mobile Telecommunications System (UMTS) and basic standardization thereof is currently underway in the 3GPP. E-UMTS may be generally referred to as a Long Term Evolution (LTE) system. For details of the technical specifications of the UMTS and E-UMTS, reference can be made to Release 7 and Release 8 of "3rd Generation Partnership Project; Technical Specification Group Radio Access Network".

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARM)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Although wireless communication technology has been developed to LTE based on wideband code division multiple access (WCDMA), the demands and expectations of users and service providers are on the rise. In addition, considering other radio access technologies under development, new technological evolution is required to secure high competitiveness in the future. Decrease in cost per bit, increase in service availability, flexible use of frequency bands, a simplified structure, an open interface, appropriate power consumption of UEs, and the like are required.

As more and more communication devices demand larger communication capacity, there is a need for improved mobile broadband communication compared to existing RAT. Also, massive machine type communication (MTC), which provides various services by connecting many devices and objects, is one of the major issues to be considered in the next generation communication (NR, New Radio). In addition, a communication system design considering a service/UE sensitive to reliability and latency is being discussed. The introduction of next-generation RAT, which takes into account such Enhanced Mobile BroadBand (eMBB) transmission, and ultra-reliable and low latency communication (URLLC) transmission, is being discussed.

DISCLOSURE OF INVENTION

Technical Problem

An object of the present invention devised to solve the problem lies in a method and device for performing a SPS activation in multiple SPS resources in wireless communication system.

In prior art, Semi-Persistent Scheduling (SPS) can be activated by PDCCH masked with SPS C-RNTI with the New Data Indicator (NDI) field set to 0 and the configured resource would be used until SPS released. To deactivate SPS, the explicit SPS release command or the implicit SPS release mechanism is used.

In a case of explicit SPS release command, a UE needs to receive SPS release command and send SPS confirmation for the explicit SPS release (i.e. SPS confirmation MAC Control Element triggered by the SPS release). On the other hand, in implicit SPS release mechanism, the UE shall clear the configured resources immediately after a certain number of consecutive new MAC PDUs each containing zero MAC SDUs on the SPS resource.

The sSPS on PCell was introduced in RAN2#99bis, and in RAN2#100, RAN2 agreed that SPS and sSPS are not active at the same time. Upon these agreements, a method for switching for from SPS to sSPS, and vice versa, is required without explicit SPS release command.

The technical problems solved by the present invention are not limited to the above technical problems and those skilled in the art may understand other technical problems from the following description.

Solution to Problem

The object of the present invention can be achieved by providing a method for User Equipment (UE) operating in a wireless communication system as set forth in the appended claims.

In another aspect of the present invention, provided herein is a communication apparatus as set forth in the appended claims.

It is to be understood that both the foregoing general description and the following detailed description of the present invention are exemplary and explanatory and are intended to provide further explanation of the invention as claimed.

Advantageous Effects of Invention

According to the present invention, in a case that a set of SPS resources is activated in the UE, the UE can deactivate the activated set of SPS resources by receiving a single activation command for another set of SPS resources.

This has the advantage of automatically deactivating the activated set of SPS resources without the deactivated command, thus reducing resource waste.

Furthermore, the UE has the advantage of transmitting a single SPS confirmation MAC CE triggered by the activation command to inform the base station of deactivation and activation simultaneously.

It will be appreciated by persons skilled in the art that the effects achieved by the present invention are not limited to what has been particularly described hereinabove and other advantages of the present invention will be more clearly understood from the following detailed description taken in conjunction with the accompanying drawings.

BRIEF DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

FIG. 1 is a diagram showing a network structure of an Evolved Universal Mobile Telecommunications System (E-UMTS) as an example of a wireless communication system;

FIG. 2a is a block diagram illustrating network structure of an evolved universal mobile telecommunication system (E-UMTS), and FIG. 2b is a block diagram depicting architecture of a typical E-UTRAN and a typical EPC;

FIG. 3 is a diagram showing a control plane and a user plane of a radio interface protocol between a UE and an E-UTRAN based on a 3rd generation partnership project (3GPP) radio access network standard;

FIG. 4a is a block diagram illustrating network structure of NG Radio Access Network (NG-RAN) architecture, and FIG. 4b is a block diagram depicting architecture of functional Split between NG-RAN and 5G Core Network (5GC);

FIG. 5 is a diagram showing a control plane and a user plane of a radio interface protocol between a UE and a NG-RAN based on a 3rd generation partnership project (3GPP) radio access network standard;

FIG. 6 is a block diagram of a communication apparatus according to an embodiment of the present invention;

FIG. 7 is a conceptual diagram for performing a SPS activation and a SPS deactivation in a prior art;

FIG. 8 is a conceptual diagram for performing a SPS activation in multiple SPS resources by a User Equipment in wireless communication system according to embodiments of the present invention;

FIG. 9 is a conceptual diagram for performing a SPS activation in multiple SPS resources by a network in wireless communication system according to embodiments of the present invention; and FIG. 10 is an example for performing a SPS activation in multiple SPS resources in wireless communication system according to embodiments of the present invention.

BEST MODE FOR CARRYING OUT THE INVENTION

Universal mobile telecommunications system (UMTS) is a 3rd Generation (3G) asynchronous mobile communication system operating in wideband code division multiple access (WCDMA) based on European systems, global system for mobile communications (GSM) and general packet radio services (GPRS). The long-term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3G LTE requires reduced cost per bit, increased service availability, flexible use of a frequency band, a simple structure, an open interface, and adequate power consumption of a terminal as an upper-level requirement.

Hereinafter, structures, operations, and other features of the present invention will be readily understood from the embodiments of the present invention, examples of which are illustrated in the accompanying drawings. Embodiments described later are examples in which technical features of the present invention are applied to a 3GPP system.

Although the embodiments of the present invention are described using a long term evolution (LTE) system and a LTE-advanced (LTE-A) system in the present specification, they are purely exemplary. Therefore, the embodiments of the present invention are applicable to any other communication system corresponding to the above definition. In addition, although the embodiments of the present invention are described based on a frequency division duplex (FDD) scheme in the present specification, the embodiments of the present invention may be easily modified and applied to a half-duplex FDD (H-FDD) scheme or a time division duplex (TDD) scheme.

FIG. 2a is a block diagram illustrating network structure of an evolved universal mobile telecommunication system (E-UMTS). The E-UMTS may be also referred to as an LTE system. The communication network is widely deployed to provide a variety of communication services such as voice (VoIP) through IMS and packet data.

As illustrated in FIG. 2a, the E-UMTS network includes an evolved UMTS terrestrial radio access network (E-UTRAN), an Evolved Packet Core (EPC) and one or more user equipment. The E-UTRAN may include one or more evolved NodeB (eNodeB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from eNodeB 20 to UE 10, and "uplink" refers to communication from the UE to an eNodeB. UE 10 refers to communication equipment carried by a user and may be also referred to as a mobile station (MS), a user terminal (UT), a subscriber station (SS) or a wireless device.

FIG. 2b is a block diagram depicting architecture of a typical E-UTRAN and a typical EPC.

As illustrated in FIG. 2B, an eNodeB 20 provides end points of a user plane and a control plane to the UE 10. MME/SAE gateway 30 provides an end point of a session and mobility management function for UE 10. The eNodeB and MME/SAE gateway may be connected via an S1 interface.

The eNodeB 20 is generally a fixed station that communicates with a UE 10, and may also be referred to as a base station (BS) or an access point. One eNodeB 20 may be deployed per cell. An interface for transmitting user traffic or control traffic may be used between eNodeBs 20.

The MME provides various functions including NAS signaling to eNodeBs 20, NAS signaling security, AS Security control, Inter CN node signaling for mobility between 3GPP access networks, Idle mode UE Reachability (including control and execution of paging retransmission), Tracking Area list management (for UE in idle and active mode), PDN GW and Serving GW selection, MME selection for handovers with MME change, SGSN selection for handovers to 2G or 3G 3GPP access networks, Roaming, Authentication, Bearer management functions including dedicated bearer establishment, Support for PWS (which includes ETWS and CMAS) message transmission. The SAE gateway host provides assorted functions including Per-user based packet filtering (by e.g. deep packet inspection), Lawful Interception, UE IP address allocation, Transport level packet marking in the downlink, UL and DL service level charging, gating and rate enforcement, DL rate enforcement based on APN-AMBR. For clarity MME/SAE gateway 30 will be referred to herein simply as a "gateway," but it is understood that this entity includes both an MME and an SAE gateway.

A plurality of nodes may be connected between eNodeB 20 and gateway 30 via the S1 interface. The eNodeBs 20 may be connected to each other via an X2 interface and neighboring eNodeBs may have a meshed network structure that has the X2 interface.

As illustrated, eNodeB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNodeB measurements, radio bearer control, radio admission control (RAC), and connection mobility control in LTE_ACTIVE state. In the EPC, and as noted above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

The EPC includes a mobility management entity (MME), a serving-gateway (S-GW), and a packet data network-gateway (PDN-GW). The MME has information about connections and capabilities of UEs, mainly for use in managing the mobility of the UEs. The S-GW is a gateway having the E-UTRAN as an end point, and the PDN-GW is a gateway having a packet data network (PDN) as an end point.

FIG. 3 is a diagram showing a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

A physical (PHY) layer of a first layer provides an information transfer service to a higher layer using a physical channel. The PHY layer is connected to a medium access control (MAC) layer located on the higher layer via a transport channel. Data is transported between the MAC layer and the PHY layer via the transport channel. Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

The MAC layer of a second layer provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other.

One cell of the eNB is set to operate in one of bandwidths such as 1.25, 2.5, 5, 10, 15, and 20 MHz and provides a downlink or uplink transmission service to a plurality of UEs in the bandwidth. Different cells may be set to provide different bandwidths.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH).

Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

FIG. 4a is a block diagram illustrating network structure of NG Radio Access Network (NG-RAN) architecture, and FIG. 4b is a block diagram depicting architecture of functional Split between NG-RAN and 5G Core Network (5GC).

An NG-RAN node is a gNB, providing NR user plane and control plane protocol terminations towards the UE, or an ng-eNB, providing E-UTRA user plane and control plane protocol terminations towards the UE.

The gNBs and ng-eNBs are interconnected with each other by means of the Xn interface. The gNBs and ng-eNBs are also connected by means of the NG interfaces to the 5GC, more specifically to the AMF (Access and Mobility Management Function) by means of the NG-C interface and to the UPF (User Plane Function) by means of the NG-U interface.

The Xn Interface includes Xn user plane (Xn-U), and Xn control plane (Xn-C). The Xn User plane (Xn-U) interface is defined between two NG-RAN nodes. The transport network layer is built on IP transport and GTP-U is used on top of UDP/IP to carry the user plane PDUs. Xn-U provides non-guaranteed delivery of user plane PDUs and supports the following functions: i) Data forwarding, and ii) Flow control. The Xn control plane interface (Xn-C) is defined between two NG-RAN nodes. The transport network layer is built on SCTP on top of IP. The application layer signalling protocol is referred to as XnAP (Xn Application Protocol). The SCTP layer provides the guaranteed delivery of application layer messages. In the transport IP layer point-to-point transmission is used to deliver the signalling PDUs. The Xn-C interface supports the following functions: i) Xn interface management, ii) UE mobility management, including context transfer and RAN paging, and iii) Dual connectivity.

The NG Interface includes NG User Plane (NG-U) and NG Control Plane (NG-C). The NG user plane interface (NG-U) is defined between the NG-RAN node and the UPF. The transport network layer is built on IP transport and GTP-U is used on top of UDP/IP to carry the user plane PDUs between the NG-RAN node and the UPF. NG-U provides non-guaranteed delivery of user plane PDUs between the NG-RAN node and the UPF.

The NG control plane interface (NG-C) is defined between the NG-RAN node and the AMF. The transport network layer is built on IP transport. For the reliable transport of signalling messages, SCTP is added on top of IP. The application layer signalling protocol is referred to as NGAP (NG Application Protocol). The SCTP layer provides guaranteed delivery of application layer messages. In the transport, IP layer point-to-point transmission is used to deliver the signalling PDUs.

NG-C provides the following functions: i) NG interface management, ii) UE context management, iii) UE mobility management, iv) Configuration Transfer, and v) Warning Message Transmission.

The gNB and ng-eNB host the following functions: i) Functions for Radio Resource Management: Radio Bearer Control, Radio Admission Control, Connection Mobility Control, Dynamic allocation of resources to UEs in both uplink and downlink (scheduling), ii) IP header compression, encryption and integrity protection of data, iii) Selection of an AMF at UE attachment when no routing to an AMF can be determined from the information provided by the UE, iv) Routing of User Plane data towards UPF(s), v) Routing of Control Plane information towards AMF, vi) Connection setup and release, vii) Scheduling and transmission of paging messages (originated from the AMF), viii) Scheduling and transmission of system broadcast information (originated from the AMF or O&M), ix) Measurement and measurement reporting configuration for mobility and scheduling, x) Transport level packet marking in the uplink, xi) Session Management, xii) Support of Network Slicing, and xiii) QoS Flow management and mapping to data radio bearers. The Access and Mobility Management Function (AMF) hosts the following main functions: i) NAS signalling termination, ii) NAS signalling security, iii) AS Security control, iv) Inter CN node signalling for mobility between 3GPP access networks, v) Idle mode UE Reachability (including control and execution of paging retransmission), vi) Registration Area management, vii) Support of intra-system and inter-system mobility, viii) Access Authentication, ix) Mobility management control (subscription and policies), x) Support of Network Slicing, and xi) SMF selection.

The User Plane Function (UPF) hosts the following main functions: i) Anchor point for Intra-/Inter-RAT mobility (when applicable), ii) External PDU session point of interconnect to Data Network, iii) Packet inspection and User plane part of Policy rule enforcement, iv) Traffic usage reporting, v) Uplink classifier to support routing traffic flows to a data network, vi) QoS handling for user plane, e.g. packet filtering, gating, UL/DL rate enforcement, and vii) Uplink Traffic verification (SDF to QoS flow mapping).

The Session Management function (SMF) hosts the following main functions: i) Session Management, ii) UE IP address allocation and management, iii) Selection and control of UP function, iv) Configures traffic steering at UPF to route traffic to proper destination, v) Control part of policy enforcement and QoS, vi) Downlink Data Notification.

FIG. 5 is a diagram showing a control plane and a user plane of a radio interface protocol between a UE and a NG-RAN based on a 3rd generation partnership project (3GPP) radio access network standard.

The user plane protocol stack contains Phy, MAC, RLC, PDCP and SDAP (Service Data Adaptation Protocol) which is newly introduced to support 5G QoS model.

The main services and functions of SDAP entity include i) Mapping between a QoS flow and a data radio bearer, and ii) Marking QoS flow ID (QFI) in both DL and UL packets. A single protocol entity of SDAP is configured for each individual PDU session.

At the reception of an SDAP SDU from upper layer for a QoS flow, the transmitting SDAP entity may map the SDAP SDU to the default DRB if there is no stored QoS flow to DRB mapping rule for the QoS flow. If there is a stored QoS flow to DRB mapping rule for the QoS flow, the SDAP entity may map the SDAP SDU to the DRB according to the stored QoS flow to DRB mapping rule. And the SDAP entity may construct the SDAP PDU and deliver the constructed SDAP PDU to the lower layers.

FIG. 6 is a block diagram of communication devices according to an embodiment of the present invention.

The apparatus shown in FIG. 6 can be a user equipment (UE) and/or eNB or gNB adapted to perform the above mechanism, but it can be any device for performing the same operation.

As shown in FIG. 6, one of the communication device 1100 and the communication device 1200 may be a user equipment (UE) and the other one mat be a base station. Alternatively, one of the communication device 1100 and the communication device 1200 may be a UE and the other one may be another UE. Alternatively, one of the communication device 1100 and the communication device 1200 may be a network node and the other one may be another network node. In the present disclosure, the network node may be a base station (BS). In some scenarios, the network node may be a core network device (e.g. a network device with a mobility management function, a network device with a session management function, and etc.).

In some scenarios of the present disclosure, either one of the communication devices 1100, 1200, or each of the communication devices 1100, 1200 may be wireless communication device(s) configured to transmit/receive radio signals to/from an external device, or equipped with a wireless communication module to transmit/receive radio signals to/from an external device. The wireless communication module may be a transceiver. The wireless communication device is not limited to a UE or a BS, and the wireless communication device may be any suitable mobile computing device that is configured to implement one or more implementations of the present disclosure, such as a vehicular communication system or device, a wearable device, a laptop, a smartphone, and so on. A communication device which is mentioned as a UE or BS in the present disclosure may be replaced by any wireless communication device such as a vehicular communication system or device, a wearable device, a laptop, a smartphone, and so on.

In the present disclosure, communication devices 1100, 1200 include processors 1111, 1211 and memories 1112, 1212. The communication devices 1100 may further include transceivers 1113, 1213 or configured to be operatively connected to transceivers 1113, 1213.

The processor 1111 and/or 1211 implements functions, procedures, and/or methods disclosed in the present disclosure. One or more protocols may be implemented by the processor 1111 and/or 1211. For example, the processor 1111 and/or 1211 may implement one or more layers (e.g., functional layers). The processor 1111 and/or 1211 may generate protocol data units (PDUs) and/or service data units (SDUs) according to functions, procedures, and/or methods disclosed in the present disclosure. The processor 1111 and/or 1211 may generate messages or information according to functions, procedures, and/or methods disclosed in the present disclosure. The processor 1111 and/or 1211 may generate signals (e.g. baseband signals) containing PDUs, SDUs, messages or information according to functions, procedures, and/or methods disclosed in the present disclosure and provide the signals to the transceiver 1113 and/or 1213 connected thereto. The processor 1111 and/or 1211 may receive signals (e.g. baseband signals) from the transceiver 1113 and/or 1213 connected thereto and obtain PDUs, SDUs, messages or information according to functions, procedures, and/or methods disclosed in the present disclosure.

The memory of 1112 and/or 1212 is connected to the processor of the network node and stores various types of PDUs, SDUs, messages, information and/or instructions. The memory 1112 and/or 1212 may be arranged inside or outside the processor 1111 and/or 1211, respectively, and may be connected the processor 1111 and/or 1211, respectively, through various techniques, such as wired or wireless connections.

The transceiver 1113 and/or 1213 is connected to the processor 1111 and/or 1211, respectively, and may be controlled by the processor 1111 and/or 1211, respectively, to transmit and/or receive a signal to/from an external device. The processor 1111 and/or 1211 may control transceiver 1113 and/or 1213, respectively, to initiate communication and to transmit or receive signals including various types of information or data which are transmitted or received through a wired interface or wireless interface. The transceivers 1113, 1213 include a receiver to receive signals from an external device and transmit signals to an external device.

In a wireless communication device such as a UE or BS, an antenna facilitates the transmission and reception of radio signals (i.e. wireless signals). In the wireless communication device, the transceiver 1113 or 1213 transmits and/or receives a wireless signal such as a radio frequency (RF) signal. For a communication device which is a wireless communication device (e.g. BS or UE), the transceiver 1113 or 1213 may be referred to as a radio frequency (RF) unit.

In some implementations, the transceiver 1113 and/or 1213 may forward and convert baseband signals provided by the processor 1111 and/or 1211 connected thereto into radio signals with a radio frequency. In the wireless communication device, the transceiver 1113 or 1213 may transmit or receive radio signals containing PDUs, SDUs, messages or information according to functions, procedures, and/or methods disclosed in the present disclosure via a radio interface (e.g. time/frequency resources). In some implementations, upon receiving radio signals with a radio frequency from another communication device, the transceiver 1113 and/or 1213 may forward and convert the radio signals to baseband signals for processing by the processor 1111 and/or 1211. The radio frequency may be referred to as a carrier frequency. In a UE, the processed signals may be processed according to various techniques, such as being transformed into audible or readable information to be output via a speaker of the UE.

In some scenarios of the present disclosure, functions, procedures, and/or methods disclosed in the present disclosure may be implemented by a processing chip. The processing chip may be a system on chip (SoC). The processing chip may include the processor 1111 or 1211 and the memory 1112 or 1212, and may be mounted on, installed on, or connected to the communication device 1100 or 1200. The processing chip may be configured to perform or control any one of the methods and/or processes described herein and/or to cause such methods and/or processes to be performed by a communication device which the processing chip is mounted on, installed on, or connected to. The memory 1112 or 1212 in the processing chip may be configured to store software codes including instructions that, when executed by the processor, causes the processor to perform some or all of functions, methods or processes discussed in the present disclosure. The memory 1112 or 1212 in the processing chip may store or buffer information or data generated by the processor of the processing chip or information recovered or obtained by the processor of the processing chip. One or more processes involving transmission or reception of the information or data may be performed by the processor 1111 or 1211 of the processing chip or under control of the processor 1111 or 1211 of the processing chip. For example, a transceiver 1113 or 1213 operably connected or coupled to the processing chip may transmit or receive signals containing the information or data under the control of the processor 1111 or 1211 of the processing chip.

For a communication device which is a wireless communication device (e.g. BS or UE), the communication device may include or be equipped with a single antenna or multiple antennas. The antenna may be configured to transmit and/or receive a wireless signal to/from another wireless communication device.

For a communication device which is a UE, the communication device may further include or be equipped with a power management module, an antenna, a battery, a display, a keypad, a Global Positioning System (GPS) chip, a sensor, a memory device, a Subscriber Identification Module (SIM) card (which may be optional), a speaker and/or a microphone. The UE may include or be equipped with a single antenna or multiple antennas. A user may enter various types of information (e.g., instructional information such as a telephone number), by various techniques, such as by pushing buttons of the keypad or by voice activation using the microphone. The processor of the UE receives and processes the user's information and performs the appropriate function (s), such as dialing the telephone number. In some scenarios, data (e.g., operational data) may be retrieved from the SIM card or the memory device to perform the function(s). In some scenarios, the processor of the UE may receive and process GPS information from a GPS chip to perform functions related to a position or a location of a UE, such as vehicle navigation, a map service, and so on. In some scenarios, the processor may display these various types of information and data on the display for the user's reference and convenience. In some implementations, a sensor may be coupled to the processor of the UE. The sensor may include one or more sensing devices configured to detect various types of information including, but not limited to, speed, acceleration, light, vibration, proximity, location, image and so on. The processor of the UE may receive and process sensor information obtained from the sensor and may perform various types of functions, such as collision avoidance, autonomous driving and so on. Various components (e.g., a camera, a Universal Serial Bus (USB) port, etc.) may be further included in the UE. For example, a camera may be further coupled to the processor of the UE and may be used for various services such as autonomous driving, a vehicle safety service and so on. In some scenarios, some components, e.g., a keypad, a Global Positioning System (GPS) chip, a sensor, a speaker and/or a microphone, may not be implemented in a UE.

FIG. 7 is a conceptual diagram for performing a SPS activation and a SPS deactivation in a prior art.

In addition, with Configured Grants, the network can allocate uplink resources for the initial HARQ transmissions to UEs. Two types of configured uplink grants are defined.

With Type 1, RRC directly provides the configured uplink grant (including the periodicity.

With Type 2, RRC defines the periodicity of the configured uplink grant while PDCCH addressed to CS-RNTI can either signal and activate the configured uplink grant, or deactivate it; i.e. a PDCCH addressed to CS-RNTI indicates that the uplink grant can be implicitly reused according to the periodicity defined by RRC, until deactivated. Here, Type 2 is referred to as SPS.

For SPS activation and release, the UE receives PDCCH command addressed by SPS C-RNTI with NDI value set to 1. The PDCCH contents can indicate whether SPS release or activation. In the TTI the UE receives the PDCCH for SPS activation/release, the UE activates/releases the SPS resources.

Up to Rel-12, for UL SPS activation/release, the UE sends no feedback. For SPS activation, the eNB can implicitly know whether the UE successfully receives the PDCCH for SPS activation/release by monitoring whether the UE transmits a MAC PDU on the allocated resources or not. For SPS release, due to implicit SPS release, resource waste due to PDCCH loss could be resolved.

In Rel-13, in the scope of latency reduction study item, it was agreed to allow for the UE to skip uplink transmission if there is no data to transmit. As a result, the eNB cannot tell whether the UE has no data available for transmission or the UE has no SPS grants due to e.g., release of SPS grants or loss of PDCCH for SPS activation. In order to cope with this problem, it has been proposed to send a feedback for SPS activation/release by transmitting an SPS confirmation MAC Control Element.

In LTE, if a PDCCH contents indicating SPS release or SPS activating is received, and if the MAC entity is configured with skipUplinkTxSPS, the UE triggers an SPS confirmation. And when SPS confirmation has been triggered and not cancelled and if the MAC entity has UL resources allocated for new transmission for this TTI, the UE instructs the Multiplexing and Assembly procedure to generate an SPS confirmation MAC Control Element, and cancels the triggered SPS confirmation. The MAC entity shall clear the configured uplink grant immediately after first transmission of SPS confirmation MAC Control Element triggered by the SPS release.

In NR, if an uplink grant for this PDCCH occasion has been received for this Serving Cell on the PDCCH for the MAC entity's CS-RNTI, and if PDCCH contents indicate configured grant Type 2 deactivation, the UE triggers configured uplink grant confirmation. And if an uplink grant for this PDCCH occasion has been received for this Serving Cell on the PDCCH for the MAC entity's CS-RNTI and if PDCCH contents indicate configured grant Type 2 activation, the UE triggers configured uplink grant confirmation.

If the configured uplink grant confirmation has been triggered and not cancelled, and if the MAC entity has UL resources allocated for new transmission, the UE instructs the Multiplexing and Assembly procedure to generate an Configured Grant Confirmation MAC CE and cancels the triggered configured uplink grant confirmation. For a configured grant Type 2, the MAC entity shall clear the configured uplink grant immediately after first transmission of Configured Grant Confirmation MAC CE triggered by the configured uplink grant deactivation.

As shown FIG. 7, the confirmation MAC Control Element (or Configured Grant Confirmation MAC CE) should be transmitted in response to the deactivation/activation command, respectively.

In short, SPS can be activated by PDCCH masked with SPS C-RNTI with the New Data Indicator (NDI) field set to 0 and the configured resource would be used until SPS released.

Meanwhile, to deactivate SPS, the explicit SPS release command or the implicit SPS release mechanism is used. A UE needs to receive SPS release command and send SPS confirmation for the explicit SPS release. On the other hand, in implicit SPS release mechanism, the UE shall clear the configured resources immediately after a certain number of consecutive new MAC PDUs each containing zero MAC SDUs on the SPS resource.

The sSPS on PCell was introduced in RAN2#99bis, and in RAN2#100, RAN2 agreed that SPS and sSPS are not active at the same time. Upon these agreements, a method for switching for from SPS to sSPS, and vice versa, is required without explicit SPS release command.

FIG. 8 is a conceptual diagram for performing a SPS activation in multiple SPS resources by a User Equipment in wireless communication system according to embodiments of the present invention.

This embodiment describes from a user equipment perspective.

In this invention, it is proposed that, for the MAC entity configured with multiple SPS resources, the MAC entity deactivates an SPS resource which is already activated if the MAC entity receives an SPS activation command which activates a SPS resource which is different from the already activated SPS resource. In other words, the MAC entity deactivates the SPS resource which is already activated even without receiving an SPS deactivation command for that SPS resource.

A MAC entity is configured with multiple SPS resources according by receiving multiple SPS configuration from a network (S801).

Preferably, each of the multiple SPS configuration includes configuration information for a set of SPS resources. A set of SPS resources includes multiple SPS transmission occasions according to e.g., an SPS periodicity.

Preferably, multiple sets of SPS resources may or may not be configured on a same carrier/cell.

Preferably, multiple sets of SPS resources can be configured based on different numerologies, e.g., sTTI vs normal TTI.

When the MAC entity receives an SPS activation command which activates a first set of SPS resources from the network (S803), the MAC entity deactivates the second set of SPS resources which is already activated in the MAC entity even if the MAC entity doesn't receive an SPS deactivation command which deactivates the second set of SPS resources (S805).

Preferably, when the MAC entity deactivates second set of SPS resources, it means that the MAC entity clears the second set of SPS resources and stops using the second set of SPS resources while the RRC entity keeps the SPS configuration.

Preferably, if there is an already activated second set SPS resources in the MAC entity and if the first set of SPS resources indicated by the SPS activation command is different from a second set of SPS resources which is already activated in the MAC entity, the MAC entity deactivates the second set of SPS resources which is already activated in the MAC entity even if the MAC entity doesn't receive an SPS deactivation command which deactivates the second set of SPS resources.

The MAC entity activates the first set of SPS resources which is indicated by the SPS activation command (S807).

Preferably when the MAC entity activates/reactivates an SPS resources, it means that the MAC entity initializes/re-initializes the first set of SPS resources and starts using the first set of SPS resources.

And the MAC entity transmits SPS confirmation MAC CE which indicates that the MAC entity successfully deactivates the already activated SPS resources and activates the new SPS resources (S809).

Meanwhile, if the first set of SPS resources indicated by the SPS activation command is the same as the second set of SPS resources which is already activated in the MAC entity, or if there is no SPS resource which is already activated in the MAC entity, the MAC entity activates/reactivates the SPS resource which is indicated by the SPS activation command.

In this invention, when the MAC entity successfully deactivates the second set of SPS resources and activates the first set of SPS resources, the MAC entity stops transmitting an uplink data to the network on the second set of SPS resources and the MAC entity starts transmitting an uplink data on the first set of SPS resources.

That is, when the MAC entity receives a new SPS activation command, the MAC entity activates new SPS resources and starts to use the new SPS resources and stops to use the previous SPS resources even without the explicit previous SPS release command.

For example, if the MAC entity configured with SPS #1 and SPS #2, and SPS #1 is already activated, the MAC entity switches from SPS #1 to SPS #2 when the MAC entity receives SPS activation command for SPS #2, i.e. the MAC entity activates SPS #2 and starts to use SPS #2 resources to transmit data and stops to use SPS #1 resources even without the explicit SPS release command for SPS #1.

As shown in FIG. 6, the UE (1100 or 1200) may comprises processor (1111 or 1211), Memory (1112 or 1212) and RF module (transceiver; 1113 or 1213). The processor (1111 or 1211) is electrically connected with the transceiver (1113 or 1213) and controls it.

Specifically, FIG. 6 may represent a UE comprising a processor (1111 or 1211) operably coupled with a memory (1112 or 1212) and configured to receive an activation command for a first set of Semi-Persistent Scheduling (SPS) resources from a network, wherein a second set of SPS resources which is already activated on the UE, activate the first set of SPS resources and deactivating the second set of SPS resources based on the activation command for the first set of SPS resources, and transmit a SPS confirmation Medium Access Control (MAC) Control Element (CE) which indicates that the UE successfully deactivates the second set of SPS resources and activates the first set of SPS resources, in a response to the activation command for the first set of SPS resources.

The proposed method is implemented by may be implemented by a processing chip. In case of a system on chip (SoC), the processing chip may include the processor 1111 or 1211 and the memory 1112 or 1212, and may be mounted on, installed on, or connected to the communication device 1100 or 1200.

The processing chip may be configured to receive an activation command for a first set of Semi-Persistent Scheduling (SPS) resources from a network, wherein a second set of SPS resources which is already activated, activate the first set of SPS resources and deactivating the second set of SPS resources based on the activation command for the first set of SPS resources, and transmit a SPS confirmation Medium Access Control (MAC) Control Element (CE) which indicates that the second set of SPS resources is successfully deactivated and the first set of SPS resources is successfully activated, in a response to the activation command for the first set of SPS resources.

The memory 1112 or 1212 in the processing chip may be configured to store software codes including instructions that, when executed by the processor, causes the processor to perform some or all of functions, methods or processes discussed in the present disclosure.

The transceiver 1113 or 1213 operably connected or coupled to the processing chip.

FIG. 9 is a conceptual diagram for performing a SPS activation in multiple SPS resources by a network in wireless communication system according to embodiments of the present invention.

This embodiment describes from a base station perspective.

The network transmits multiple SPS configuration for configuring the multiple SPS resources to the UE (S901).

Preferably, each of the multiple SPS configuration includes configuration information for a set of SPS resources. A set of SPS resources includes multiple SPS transmission occasions according to e.g., an SPS periodicity.

Preferably, multiple sets of SPS resources may or may not be configured on a same carrier/cell.

Preferably, multiple sets of SPS resources can be configured based on different numerologies, e.g., sTTI vs normal TTI.

The network transmits an SPS activation command which activates a second set of SPS resources to the UE (S903).

In this case, since there are no already activated SPS resources, the UE activates the second set of SPS resources indicated by the SPS activation command and starts to use second set of SPS resources.

The network receives a SPS confirmation MAC CE which indicates that the UE successfully activates the second set of SPS resource (S905).

The network transmits an SPS activation command which activates a first set of SPS resources to the UE (S907).

In this case, when the UE receives the SPS activation command, the MAC entity activates the first set of SPS resources indicated by the SPS activation command and starts to use first set of SPS resources and stops to use the previous activated second set SPS resources even without the explicit previous SPS release command.

Thus, the network receives a SPS confirmation MAC CE which indicates that the UE successfully deactivates the already activated SPS resources (e.g. a second set of SPS resource) and activates the new SPS resources (e.g. a first set of SPS resource) (S909).

The proposed method is implemented by a network apparatus, shown in FIG. 6, but it can be any apparatus for performing the same operation.

As shown in FIG. 6, the network apparatus may comprises a processor (1111 or 1211), Memory (1112 or 1212), and RF module (transceiver; 1113 or 1213). The processor (1113 or 1213) is electrically connected with the transceiver (1113 or 1213) and controls it.

Specifically, FIG. 6 may represent a network apparatus comprising a processor (1111 or 1211) operably coupled with the RF module (transceiver; 1113 or 1213) and configured to transmit multiple SPS configuration for configuring the multiple SPS resources to the UE, transmit an SPS activation command which activates a first set of SPS resources, and receive a SPS confirmation MAC CE which indicates that the UE successfully deactivates the already activated SPS resources (e.g. a second set of SPS resource) and activates the new SPS resources (e.g. a first set of SPS resource).

FIG. 10 is an example for performing a SPS activation in multiple SPS resources in wireless communication system according to embodiments of the present invention.

A MAC entity is configured with a set of SPS resources and a set of sSPS resources (S1001).

When the MAC entity receives SPS activation command which activates the set of SPS resources (S1003), the MAC entity activates the set of SPS resources and starts to use the set of SPS resources (S1005).

When the MAC entity receives SPS activation command which activates the set of sSPS resources (S1007), the MAC entity deactivates the set of SPS resources and stops to use the set of SPS resources (S1009).

The MAC entity activates the set of sSPS resources and starts to use the set of sSPS resources for uplink data transmission (S1011).

The UE transmits a SPS confirmation MAC CE which indicates that the UE successfully deactivates the set of SPS resources and activates the set of sSPS resources (S1013).

The aforementioned implementations are achieved by combination of structural elements and features of the present disclosure in a predetermined manner. Each of the structural elements or features should be considered selectively unless specified separately. Each of the structural elements or features may be carried out without being combined with other structural elements or features. In addition, some structural elements and/or features may be combined with one another to constitute the implementations of the present disclosure. The order of operations described in the implementations of the present disclosure may be changed. Some structural elements or features of one implementation may be included in another implementation, or may be replaced with corresponding structural elements or features of another implementation. Moreover, it is apparent that some claims referring to specific claims may be combined with another claims referring to the other claims other than the specific claims to constitute the implementation or add new claims by amendment after the application is filed.

The above-described embodiments may be implemented by various means, for example, by hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors, etc.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

Those skilled in the art will appreciate that the present invention may be carried out in other specific ways than those set forth herein without departing from essential characteristics of the present invention. The above embodiments are therefore to be construed in all aspects as illustrative and not restrictive. The scope of the invention should be determined by the appended claims, not by the above description, and all changes coming within the meaning of the appended claims are intended to be embraced therein.

INDUSTRIAL APPLICABILITY

While the above-described method has been described centering on an example applied to the 3GPP LTE and NR system, the present invention is applicable to a variety of wireless communication systems in addition to the 3GPP LTE and NR system.

The invention claimed is:

1. A method performed by a communication device operating in a wireless communication system, the method comprising:
receiving an activation command for a first set of Semi-Persistent Scheduling (SPS) resources from a network, wherein a second set of SPS resources is already activated on the communication device;
activating the first set of SPS resources and deactivating the second set of SPS resources based on the activation command for the first set of SPS resources; and
transmitting a SPS confirmation Medium Access Control (MAC) Control Element (CE) which indicates that the communication device successfully deactivates the second set of SPS resources and activates the first set of SPS resources, in a response to the activation command for the first set of SPS resources,
wherein the second set of SPS resources are deactivated based on the activation command without receiving a deactivation command for deactivating the second set of SPS resources, and
wherein, based on deactivation of the second set of SPS resources without receiving the deactivation command, a MAC entity of the communication device stops using the second set of SPS resources and keeps the second set of SPS resources.

2. The method according to claim 1, further comprising: starting transmitting an uplink data to the network on the first set of SPS resources.

3. The method according to claim 1, wherein the first set of SPS resources and the second set of SPS resources are configured with different length of Transmission Time Intervals (TTIs) respectively.

4. The method according to claim 1, wherein the communication device is capable of communicating with at least one of another communication device, a communication device related to an autonomous driving vehicle, a base station and/or a network.

5. A communication device for operating in a wireless communication system, the communication device comprising:
   a memory; and
   a processor operably coupled with the memory and configured to:
   receive an activation command for a first set of Semi-Persistent Scheduling (SPS) resources from a network, wherein a second set of SPS resources is already activated on the communication device,
   activate the first set of SPS resources and deactivate the second set of SPS resources based on the activation command for the first set of SPS resources, and
   transmit a SPS confirmation Medium Access Control (MAC) Control Element (CE) which indicates that the communication device successfully deactivates the second set of SPS resources and activates the first set of SPS resources, in a response to the activation command for the first set of SPS resources,
   wherein the second set of SPS resources are deactivated based on the activation command without receiving a deactivation command for deactivating the second set of SPS resources, and
   wherein, based on deactivation of the second set of SPS resources without receiving the deactivation command, a MAC entity of the UE stops using the second set of SPS resources and keeps the second set of SPS resources.

6. The communication device according to claim 5, wherein the processor is further configured to:
   start transmitting an uplink data to the network on the first set of SPS resources.

7. The communication device according to claim 5, wherein the first set of SPS resources and the second set of SPS resources are configured with different length of Transmission Time Intervals (TTIs) respectively.

8. The communication device according to claim 5, wherein the communication device is capable of communicating with at least one of another communication device, a communication device related to an autonomous driving vehicle, a base station and/or a network.

\* \* \* \* \*